(12) United States Patent
Charles et al.

(10) Patent No.: US 11,724,783 B2
(45) Date of Patent: Aug. 15, 2023

(54) BOW CLAMP

(71) Applicant: L3Harris Technologies, Inc., Melbourne, FL (US)

(72) Inventors: David F. Charles, Arlington, VA (US); Douglas L. Veilleux, II, Rochester, MA (US); Daryl B. Slocum, La Mesa, CA (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 430 days.

(21) Appl. No.: 16/877,004

(22) Filed: May 18, 2020

(65) Prior Publication Data

US 2021/0276676 A1 Sep. 9, 2021

Related U.S. Application Data

(60) Provisional application No. 62/875,423, filed on Jul. 17, 2019.

(51) Int. Cl.
*B63G 8/00* (2006.01)
*F16B 7/04* (2006.01)
*B63B 3/13* (2006.01)

(52) U.S. Cl.
CPC ............... *B63G 8/001* (2013.01); *B63B 3/13* (2013.01); *F16B 7/0426* (2013.01); *B63G 2008/002* (2013.01)

(58) Field of Classification Search
CPC .... B63G 8/001; B63G 3/13; B63G 2008/002; F16B 7/0426
See application file for complete search history.

(56) References Cited

U.S. PATENT DOCUMENTS

| | | | | |
|---|---|---|---|---|
| 2,853,038 | A * | 9/1958 | Daly | F42B 19/005 228/175 |
| 2,890,670 | A * | 6/1959 | Le Francois | F42B 19/005 114/22 |
| 3,013,821 | A * | 12/1961 | Bogan | F16L 23/08 D23/265 |
| 6,076,467 | A * | 6/2000 | Cespedosa | F42B 15/36 102/377 |
| 6,403,873 | B1 * | 6/2002 | Amaral | F42B 19/005 102/378 |
| D703,033 | S * | 4/2014 | Karlsson | D8/396 |

(Continued)

OTHER PUBLICATIONS

"Six Things You Should Know About Syntactic Foam: a Primer"; https://insights.globalspec.com/article/5618/six-things-you-should-know-about-syntactic-foam-a-primer", Jun. 22, 2017, insights.globalspec.fom (Year: 2017).*

*Primary Examiner* — Joshua T Kennedy
(74) *Attorney, Agent, or Firm* — Workman Nydegger

(57) ABSTRACT

A quick release bow clamp comprising a hinged circular body having a vehicle mating flange and a nose cone mating flange configured to selectively attach to an access plate on the bow of an underwater vehicle and a nose cone for the same, respectively. The flanges of the bow clamp and the corresponding flanges of the access plate and nose cone may include an intermittent pattern of open and solid portions for weight reduction. The bow clamp may also include a quick release clamp having an adjustable draw latch configured to attach to a clip on the body of the bow clamp and a safety latch configured to prevent the draw latch from inadvertently disengaging with the clip.

21 Claims, 4 Drawing Sheets

(56) References Cited

U.S. PATENT DOCUMENTS

| | | | |
|---|---|---|---|
| D779,315 S * | 2/2017 | Hinkle | D23/262 |
| D964,156 S * | 9/2022 | Slocum | D23/262 |
| 2002/0033126 A1* | 3/2002 | Tolkoff | F42B 19/005 |
| | | | 114/20.1 |
| 2005/0264010 A1* | 12/2005 | Wagner | F16L 23/04 |
| | | | 285/363 |
| 2011/0197398 A1* | 8/2011 | Clorley | B65D 45/345 |
| | | | 24/16 PB |
| 2020/0239226 A1* | 7/2020 | Kloepfer | B65D 90/08 |
| 2022/0268302 A1* | 8/2022 | Cobb | F16B 2/08 |

* cited by examiner

BOW CLAMP

CROSS-REFERENCE TO RELATED APPLICATIONS

This application claims the benefit of and priority to U.S. Provisional Patent Application Ser. No. 62/875,423 filed on Jul. 17, 2019 and entitled "BOW CLAMP," which application is expressly incorporated herein by reference in its entirety.

BACKGROUND OF THE INVENTION

The Field of the Invention

Embodiments herein relate generally to Unmanned Undersea Vehicles (UUVs) and related componentry.

The Relevant Technology

Unmanned Undersea Vehicles (UUVs) are frequently created and assembled in various sub-sections. Manufacturers or assemblers typically assemble the sub-sections at deployment using a wide range of tools and apparatus in order to ensure proper alignment, and fit. The size and weight of the components can complicate such fittings.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

Implementations of the present invention provide a bow clamp, including related systems, components, and methods, for joining a bow of a UUV to another module in the UUV. In one implementation, for example, a bow clamp is configured to engage at least one edge of a nose cone assembly, and to engage an opposing edge of a UUV module, such as a bow module. A manufacturer can then use the bow clamp to draw the nose cone assembly and UUV modular together, and secure the two components together in a secure fashion. In at least one embodiment, the bow clamp provides a connection to a UUV weighing between 200 and 300 pounds while operating at depths as low as approximately 1000 feet below the surface of a body of water, and without risk of separation between the bow and UUV modular component.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
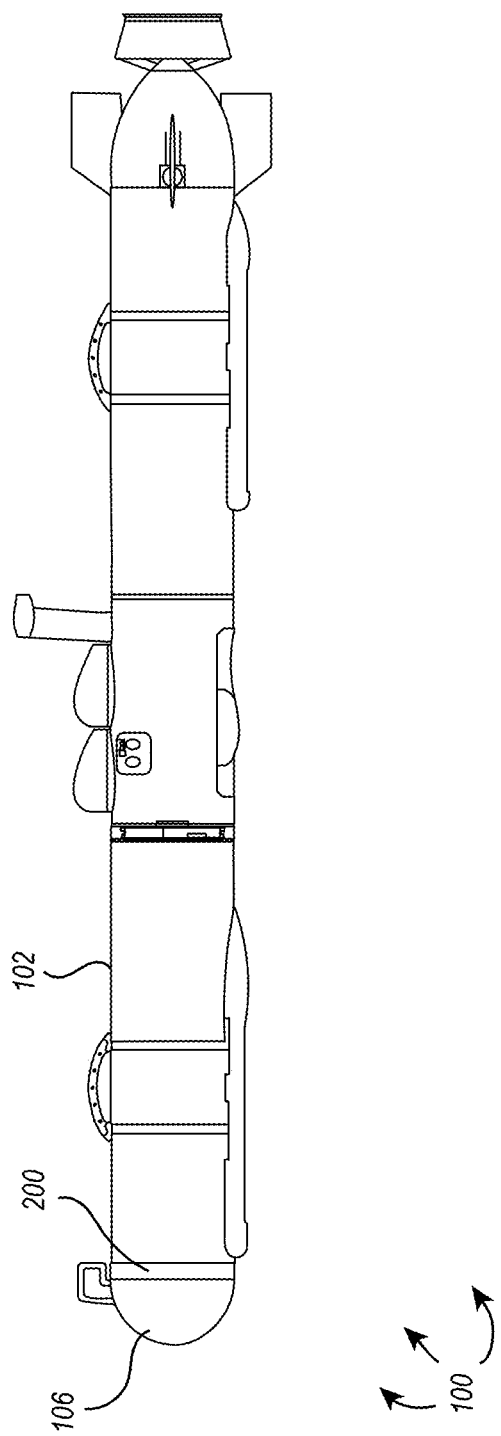
FIG. 1 illustrates a perspective view of an exemplary unmanned underwater vehicle (UUV) system with a nose cone secured to the bow by a quick release bow clamp.

Implementations of the present invention illustrated herein are directed to a bow clamp, including related systems, components, and methods, for joining a bow of an Unmanned Underwater Vehicle (UUV) to another module in the UUV. In one implementation, for example, a bow clamp is configured to engage at least one edge of a nose cone assembly, and to engage an opposing edge of a UUV module, such as a bow module. A manufacturer can then use the bow clamp to draw the nose cone assembly and UUV module together, and secure the two components together in a secure, fashion. In at least one embodiment, the bow clamp provides a nose cone connection to a UUV weighing between 200 and 300 pounds while operating at depths as low as approximately 1000 feet below the surface of a body of water, and without risk of separation or leakage between the bow and UUV modular component.

The Unmanned Underwater Vehicles for which implementations of the present bow clamp may be used can include vehicles configured to carry payloads and software packages to detect, classify, localize, identify, and/or retrieve targets. In some embodiments, such vehicles are designed to weigh less than 240 pounds, operate at approximately 1000 feet below the surface of a body of water, and measure less than 99 inches in length and 9 inches in diameter. Indeed, in some embodiments, such vehicles may be configured to be used in torpedo tubes of various watercraft. Embodiments illustrated herein may include components that help to meet certain corrosion resistance requirements. Alternatively or additionally, embodiments may include components configured to meet certain buoyancy requirements.

Specifically, a bow clamp for connecting a nose cone (or nose cone assembly) to the bow (another module or component of a multi-component UUV) of an underwater vehicle is disclosed. In some embodiments, the bow clamp includes a quick release clamp configured to selectively secure the bow clamp in a closed position, and in a manner that draws the nose cone assembly tightly to the opposing UUV module or component. Some embodiments of the quick release clamp include a draw latch configured to selectively attach to a clip. In at least one embodiment, the quick release clamp also includes a safety latch configured to prevent the quick release clamp from inadvertently opening.

In some embodiments, the bow clamp includes a nose cone mating flange and a vehicle mating flange configured to attach to corresponding flanges of a nose cone and an access plate, respectively, at the bow of an underwater vehicle or similar system. In at least one embodiment, one or more of the included flanges comprises an intermittent pattern of open portions and solid portions, which, in at least one aspect, can help reduce weight of the UUV. Importantly, the intermittent pattern can also assist in preventing inadvertent detachment of the bow clamp from the components of the vehicle. In some embodiments, the bow clamp is constructed of titanium or a similar light weight material exhibiting resistance to corrosion.

The nose cone may be positively buoyant when submerged in water. In some embodiments, the nose cone is constructed from syntactic foam comprised of hollow glass beads and urethane or a similar material, such as closed cell foam. The nose cone may include open portions and/or portions covered by alternative materials (such as materials that are transparent at various signal wavelengths), for use with sensors.

FIG. 1 illustrates an exemplary unmanned underwater vehicle 100 with multiple modular sections, also referred to herein as UUV modules or UUV components. The illustrated vehicle 100 comprises a nose cone 106 (or nose cone assembly) attached to a forward section 102 of the vehicle 100 with an exemplary bow clamp 200. Specifically, the illustrated nose cone 106 is attached to an access plate 110 located at the bow of vehicle 100. The access plate 110 seals the internal portion of the forward section 102 of the vehicle from an external environment. Indeed, the access plate has various ports, valves, and connectors to facilitate the ability to seal the forward section 102 while still having access to equipment and devices in the forward section 102. For example, in some embodiments, the access plate 110 includes an air valve that can be used to vacuum air from the forward section 102 out of the forward section 102. This valve, or another valve can be used to back fill the forward section 102 with nitrogen gas as an inert gas to prevent possible explosions, fire, corrosion, or other harmful actions.

Alternatively, or additionally, the access plate 110 may include various connectors for connecting sensors and/or other items external to the forward section 102 to components within the forward section 102. For example, in some embodiments, an ethernet connector may be included on the access plate 110 for connecting external computing devices to control computers inside of the forward section 102. Alternatively or additionally, in some embodiments, appropriate connectors may be included on the access plate 110 for connection to mating connectors of sensors intended to be deployed in the nose cone 106.

As illustrated, the nose cone 106 is attached to the access plate 110 (see FIG. 3) with a quick release bow clamp 200 as described below in relation to FIG. 2 through 5.

The nose cone 106 may be positively buoyant when submerged in water. In some embodiments, the nose cone is constructed from syntactic foam comprised of hollow glass beads and urethane. The nose cone 106 may include open portions and/or portions covered by alternative materials, for use with sensors. In some embodiments, for example, sonar sensors may be used by the vehicle 100 and the nose cone 106 may include a portion that is penetrable by the sonar signals produced and detected by the sonar sensors. Thus, the nose cone 106 may include openings to allow sonar (or other signals) to be emitted and received through the nose cone 106.

In some embodiments, while no physical opening exists, the nose cone 106 may include portions that allow certain sensors to be used. For example, the nose cone 106 may include solid portions that are transmissive of wavelengths for sonar, visible light, infrared, ultra-violet, and/or other sensor wavelengths to allow for emission and reception of sensor signals.

Figure 2:
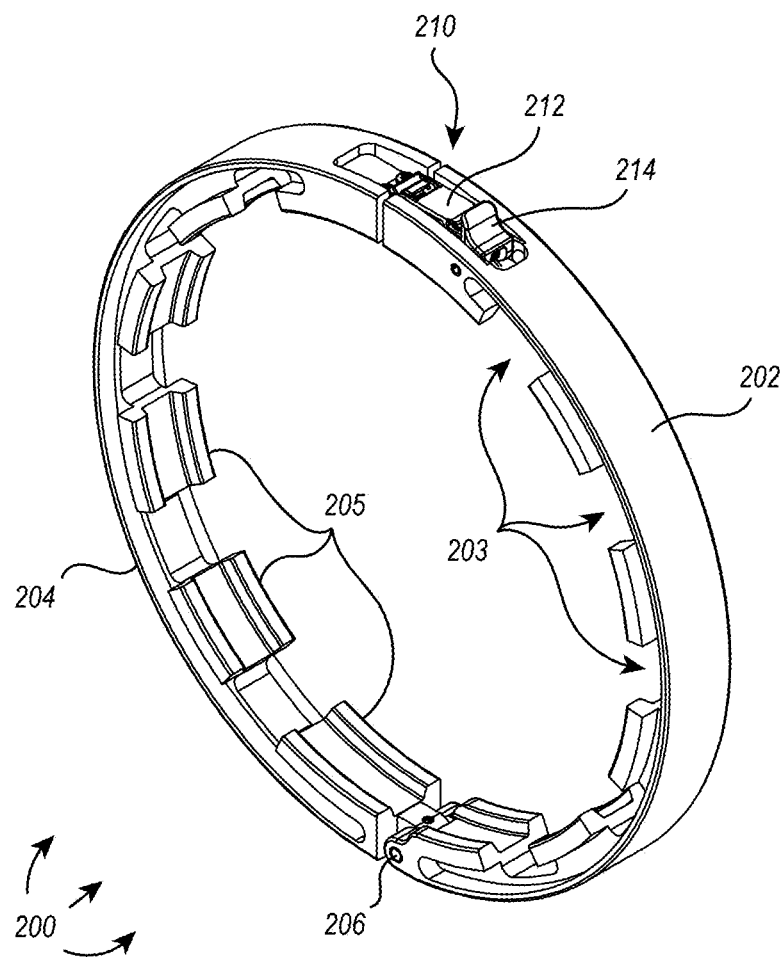
FIG. 2 illustrates a perspective view of an exemplary bow clamp.

FIG. 2 illustrates an example embodiment of the bow clamp 200. In particular, FIG. 2 illustrates a bow clamp 200, wherein the bow clamp 200 includes a nose cone mating flange 202 and a vehicle mating flange 204, i.e., a flange for connecting another UUV module on an opposing side of the clamp 200. The nose cone mating flange 202 is configured to connect to a flange 108 on the nose cone 106 (see FIG. 3). The vehicle mating flange 204 is configured to connect to a flange on the body of the vehicle, and in particular, on a flange 112 of an access plate 110 connected to the body of the vehicle 100.

In at least one embodiment, the bow clamp 200 can be constructed of titanium. Advantages of a titanium construction include light weight and resistance to corrosion. Alternatively, the bow clamp 200 may be constructed of other materials exhibiting low density and resistance to the corrosive effects of the intended environment of use. For example, some embodiments may implement an aluminum alloy.

In particular, it may be desirable that the vehicle 100 be optimized to have a light weight. Additional weight reduction is achieved in some embodiments by removing unnecessary material, such as by removing material from the flanges 202 and 204 of the bow clamp 200, i.e., between solid portions 205. As illustrated in FIG. 2, for example, the nose cone mating flange 202 and the vehicle mating flange 204 include open portions 203 that are devoid of material, as well as solid portions 205. The open portions 203 and solid portions 205 along the collar of the clamp 200 are intermittently spaced around the bow clamp 200.

One will appreciate from reading this specification and claims that the intermittent spacing of the open portions 203 and solid portions 205 can involve certain novel choices to be made with respect to the access plate flange 112 and the nose cone flange 108 in order to prevent the clamp 200 from disengaging with the access plate 110 or the nose cone 106. For example, the access plate flange 112 should be of a size and shape to prevent the occurrence of an orientation in which the clamp 200 would disengage from the flange 112 as a result of the open portions 203 of the vehicle mounting flange 204 lining up with the protruding portions of the access plate flange 112 (e.g., FIG. 3). This can be achieved in a number of different ways.

In some embodiments, for example, open portions 203 of the vehicle mating flange 204 can be smaller than the corresponding solid portions of the access plate flange 112. Alternatively, open portions of the access plate flange 112 can be smaller than the solid portions 205 of the vehicle mating flange. Alternatively or additionally, different sizes and/or patterns of solid portions and open portions of corresponding flanges 112, 204 can be utilized to prevent the bow clamp 200 from disengaging with the access plate 110. Similar conditions and configurations can be employed with respect to the nose cone mating flange 202 and the flange 108 on the nose cone 106 (see description of FIG. 3 below).

In addition, the open portions 203 can be adjusted to provide the added benefit of weight reduction. For a UUV that is between about 200 to about 300 pounds. In one embodiment, the UUV is less than about 250 pounds. In an alternative embodiment, the UUV is 240 pounds or less. Several ounces of weight reduction can provide a large benefit to the UUV without sacrificing the strength or qualify of the seal between nose cone 106 and opposing UUV module. A chance of even a couple of ounces in material loss or gain can mean the difference between positive and negative buoyancy in a UUV.

Along these lines, FIG. 2 shows that the solid portions 205 and open portions 203 are roughly equal in size relative to the inner collar surface of the clamp 200. One will appreciate that other UUV's of different weight dimension might include open portions 203 that are much smaller between the solid portions 205, and in some cases may not be present at all. In other cases, the solid portions 205 may be relatively small, and occupy little space along the inner surface of the clamp 200. In some embodiments, the sizes of the solid portions 205 and open portions 203 can vary. In some embodiments, this allows for a quick and efficient method of balancing the UUV about a longitudinal axis. In particular, in some embodiments, if one side of the clamp 200 is heavier than an opposite side, the orientation of the clamp, when installed, can affect overall weight distribution of the UUV along the longitudinal axis. The orientation of the clamp 200, when appropriately weighted, can be adjusted to adjust balance of the UUV along the longitudinal axis.

Each design consideration can provide different weight loss or weight gain benefits. Thus, one will appreciate that the size and spacing of solid portions 205 along the inner surface of the clamp 200 collar can provide a number of design and functional benefits to the UUV.

FIG. 2 further illustrates that the bow clamp 200 can include a quick release clamp 210. In some embodiments, the quick release clamp 210 is adjustable to modify the amount of friction pressure exerted by the quick release bow clamp 200. In some embodiments, this can be accomplished by the latch having a threaded mechanism that adjusts the length of a lever arm used for latching purposes. In particular, a user can thread a latching portion along a lever arm to have a longer or shorter lever arm for the latching portion. In at least one implementation, a decreased lever arm length increases friction pressure of the bow clamp on the nose cone 106 and the access plate 110, while a longer lever arm decreases the friction pressure on the nose cone 106 and the access plate 110. Thus, the user can adjust the lever arm by screwing the first latching portion along the length of the lever arm screw.

As illustrated in FIG. 2, some embodiments of the quick release clamp 210 can include a draw latch 212 and a safety latch 214 configured to prevent the draw latch 212 from releasing and thus opening the bow clamp during vehicle operation or otherwise. The draw latch 212 may include an adjustable arm length as described above to allow for modification of the amount of friction to be applied by the bow clamp 200 when closed. The illustrated bow clamp 200 also comprises hinge pin 206 located opposite to the quick release clamp 210.

Figure 3:
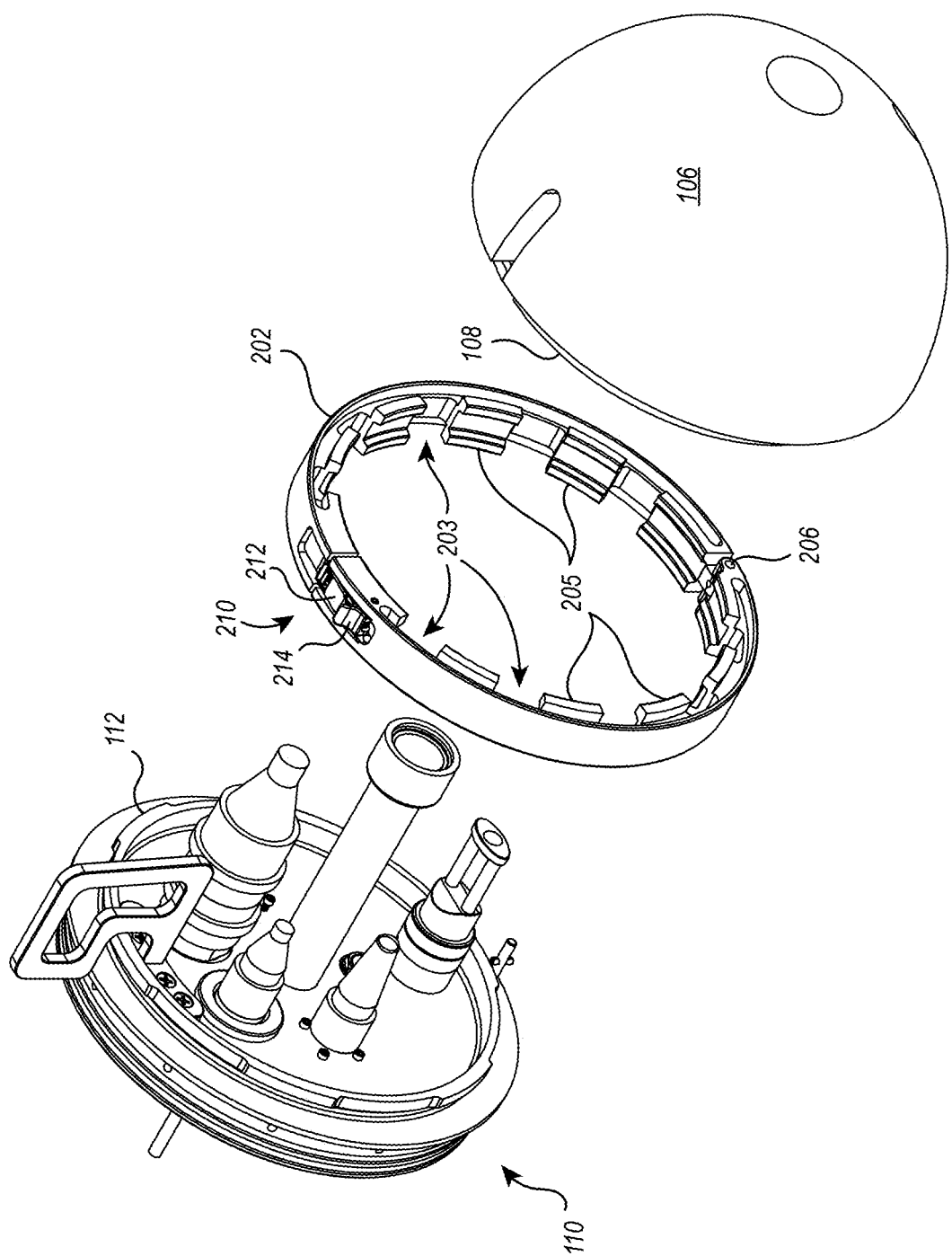
FIG. 3 illustrates a perspective view of the exemplary bow clamp of FIG. 2 in association with a UUV nose cone and access plate.

Referring now to FIG. 3, an exemplary bow clamp 200 is shown in association with a nose cone 106 and an access plate 110 that are to be joined together by the bow clamp 200. In particular, FIG. 3 shows that a bow clamp 200 can be configured to open and close by means of a hinge pin 206 located at one end of the bow clamp 200, and be secured in a closed position by means of a quick release clamp 210 located on an end of the bow clamp 200 opposite that of the hinge pin 206. FIG. 3 also shows that the quick release clamp shown can comprise a draw latch 212 having an adjustable length and a safety latch 214 configured to selectively secure the draw latch 212 in a closed position.

The embodiment illustrated in FIG. 3 also comprises a nose cone mating flange 202 and a vehicle mating flange 204, each flange having an intermittent pattern of open portions 203 and solid portions 205 as described above in relation to FIG. 2.

Figure 4:
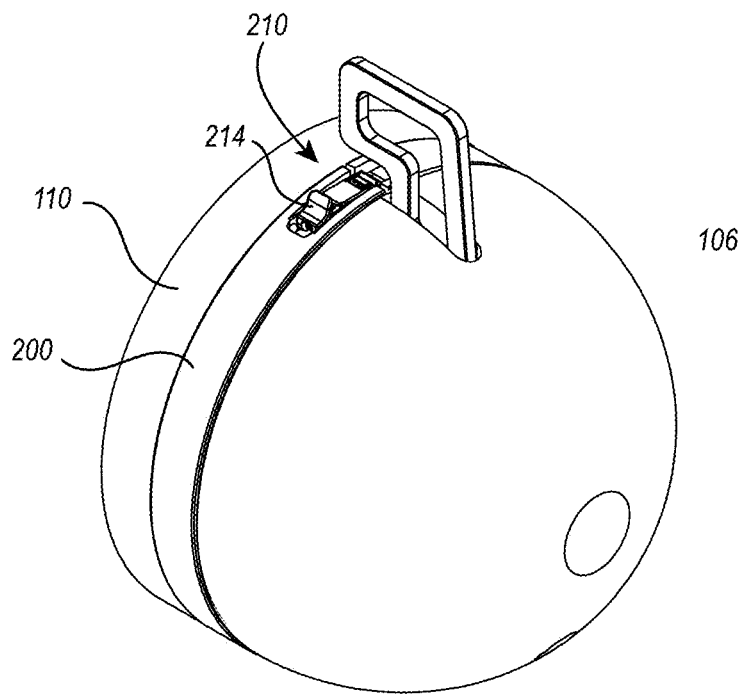
FIG. 4 illustrates a perspective view of the exemplary bow clamp, UUV nose cone and access plate of FIG. 3 in an assembled state.

FIG. 4 illustrates a nose cone 106 and an access plate 110 that are joined together by a bow clamp 200. In the embodiment shown, the bow clamp 200 can be disengaged by actuating the quick release clamp 210, or more specifically, by releasing the safety latch 214 and the draw latch 212.

Figure 5:
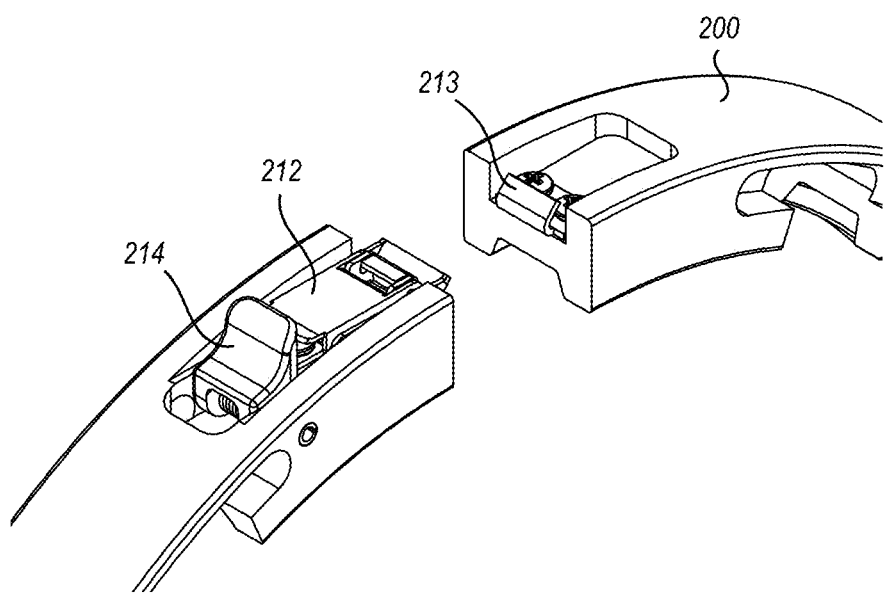
FIG. 5 illustrates a closeup perspective view of an exemplary quick release clamp installed on an exemplary bow clamp.

FIG. 5 illustrates a closeup perspective view of an exemplary quick release clamp 210. As shown, the quick release clamp 210 comprises a draw latch 212 configured to selectively attach to a clip 213 in order to secure the bow clamp 200 in a closed position. As described above, the draw latch 212 may be of an adjustable length to allow a user to modify the amount of friction asserted by the bow clamp 200 on the nose cone flange 108 and the access plate flange 112. Additionally, the quick release clamp 210 may include a safety latch 214 configured to secure the draw latch 212 in a closed position.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. An underwater vehicle comprising a system for selectively securing components of the underwater vehicle, the underwater vehicle comprising:
    an access plate secured to the bow of the vehicle and having a flange, the flange of the access plate having intermittent solid portions and intermittent open portions;
    a nose cone having a flange; and
    a bow clamp configured to selectively attach the nose cone to the access plate, the bow clamp comprising:
        a circular body comprising two semi-circular parts joined by a hinge, the hinge being operable to open the bow clamp;
        a vehicle mating flange configured to integrate with the flange of the access plate, the vehicle mating flange having intermittent solid portions and intermittent open portions;
        a nose cone mating flange configured to integrate with the flange of the nose cone;
        a clamp configured to selectively secure the bow clamp to the access plate and the nose cone;
        wherein the intermittent solid portions and intermittent open portions are sized, shaped, and spaced so as to prevent the bow clamp from disengaging from the flange of the access plate.

2. The underwater vehicle of claim 1, wherein the clamp further comprises an adjustable draw latch configured to selectively attach to a clip on the circular body of the bow clamp and a safety latch configured to prevent the draw latch from inadvertently disengaging the clip.

3. The underwater vehicle of claim 1, wherein the vehicle mating flange comprises solid sections that are larger than open sections of the flange of the access plate.

4. The underwater vehicle of claim 1, wherein the flange of the access plate comprises solid sections that are larger than open sections of the vehicle mating flange.

5. The underwater vehicle of claim 1, wherein the nose cone mating flange comprises solid sections that are larger than open sections of the flange of the nose cone.

6. The underwater vehicle of claim 1, wherein the bow clamp is at least partially constructed of titanium.

7. The underwater vehicle of claim 1, wherein the nose cone is at least partially constructed of syntactic form foam comprised of hollow glass beads and urethane.

8. The underwater vehicle of claim 1, wherein the nose cone comprises one or more openings allowing for emission and reception of sensor signals.

9. The underwater vehicle of claim 1, wherein the nose cone comprises one or more solid portions that allow for emission and reception of sensor signals.

10. The underwater vehicle of claim 1, wherein the access plate comprises a valve for vacuuming out a portion of the underwater vehicle.

11. The underwater vehicle of claim 1, wherein the access plate comprises a valve for backfilling a portion of the underwater vehicle.

12. The underwater vehicle of claim 1, wherein the access plate comprises an ethernet connector for coupling an external computing device to control computers inside of the underwater vehicle.

13. The underwater vehicle of claim 1, wherein the access plate comprises one or more connectors for sensors to be implemented in the nose cone.

14. A method of attaching a nose cone to an underwater vehicle, the method comprising:
- attaching an access plate secured to a bow of the vehicle and having a flange, the flange of the access plate having intermittent solid portions and intermittent open portions, to a nose cone having a flange by using a bow clamp configured to selectively attach the nose cone to the access plate via the flanges, the bow clamp comprising:
  - a circular body comprising two semi-circular parts joined by a hinge, the hinge being operable to open the bow clamp;
  - a vehicle mating flange configured to integrate with the flange of the access plate, the vehicle mating flange having intermittent solid portions and intermittent open portions;
  - a nose cone mating flange configured to integrate with the flange of the nose cone;
  - a clamp configured to selectively secure the bow clamp to the access plate and the nose cone;
  - wherein the intermittent solid portions and intermittent open portions are sized, shaped, spaced, and oriented so as to prevent the bow clamp from disengaging from the flange of the access plate.

15. The method of claim 14, further comprising adjusting a draw latch configured to attach to a clip on the circular body of the bow clamp.

16. The method of claim 14, wherein adjusting the draw latch comprises lengthening an adjustable arm length of the draw latch.

17. The method of claim 14, wherein adjusting the draw latch comprises shortening an adjustable arm length of the draw latch.

18. The method of claim 14, wherein one side of the bow clamp is heavier than an opposite side of the bow clamp, the method further comprising orienting the bow clamp to adjust balance of the underwater vehicle along a longitudinal axis.

19. The method of claim 14, further comprising vacuuming out a portion of the underwater vehicle.

20. The method of claim 19, further comprising backfilling a portion of the underwater vehicle.

21. The method of claim 14, further comprising coupling an external computing device to control computers inside of the underwater vehicle.

* * * * *